United States Patent [19]

Caporiccio et al.

[11] 3,864,318

[45] Feb. 4, 1975

[54] ACRYLIC AND METHACRYLIC MONOMERS, POLYMERS AND COPOLYMERS

[75] Inventors: Gerardo Caporiccio, Milan; Ezio Strepparola, Treviglio, both of Italy

[73] Assignee: Monteratini Edison S.p.A, Milan, Italy

[22] Filed: June 25, 1973

[21] Appl. No.: 373,268

Related U.S. Application Data

[62] Division of Ser. No. 108,573, Jan. 21, 1971, Pat. No. 3,766,251.

[30] Foreign Application Priority Data

Jan. 24, 1970 Italy .................................. 19750/70

[52] U.S. Cl. ............ 260/80.3 N, 117/140, 117/161, 260/86.1 E, 260/89.5 H, 260/89.5 S, 260/89.7 R, 260/486 H, 260/561 N
[51] Int. Cl. ........................... C08f 3/90, C08f 15/02
[58] Field of Search ........ 260/89.7 R, 80.3 N, 80.73

[56] References Cited
UNITED STATES PATENTS

| | | | |
|---|---|---|---|
| 2,957,914 | 10/1960 | Halpern et al. | 260/89.7 R |
| 3,544,537 | 12/1970 | Brace | 260/80.73 |
| 3,553,179 | 1/1971 | Bartlett | 260/80.3 N |

*Primary Examiner*—Harry Wong, Jr.
*Attorney, Agent, or Firm*—Hubbell, Cohen and Stiefel

[57] ABSTRACT

A new class of polymers comprising a main carbon chain and having polyfluoropolyether side groups. The polymers possess excellent soil and water resistant properties and are useful for rendering fabrics soil and moisture resistant. The polymers are prepared from a new class of polymerizable polyfluorinated polyether acrylates, methacrylates, acrylamides and methacrylamides. A new class of alcohols, useful for preparing the acrylate and methacrylate monomers is disclosed and methods for preparing the alcohols, monomers and polymers are disclosed.

9 Claims, No Drawings

ACRYLIC AND METHACRYLIC MONOMERS, POLYMERS AND COPOLYMERS

CROSS-REFERENCE TO RELATED APPLICATIONS

This is a division of co-pending application Ser. No. 108,573, filed on Jan. 21, 1971, now U.S. Pat. No. 3,766,251.

BACKGROUND OF THE INVENTION

1. Field of the Invention

The present invention relates to a new class of monomeric acrylic and methacrylic derivatives of compounds having a linear polyfluoropolyether structure, and to homopolymers and copolymers thereof. These monomeric compounds can be polymerized to form elastomeric polymers possessing many desirable properties by virtue of the polyfluoroether structure which is present as a side chain group on the main polymer chain.

2. Description of the Prior Art

Polymers derived from olefinic monomers and having fluorine-containing side groups attached to the main carbon chain are known. Such polymers frequently have certain desirable properties. For example, they are normally elastomers or rubbery polymers which can be vulcanized to produce rubbers having low temperature flexibility, excellent resistance to oxidation by air, resistance to oils and lubricants, etc..

A polymer of this type is illustrated in British Pat. No. 703,435 wherein the polymerization of an ester of acrylic acid and a 1,1-dihydroperfluoroalkyl alcohol is disclosed. U.S. Pat. No. 2,839,513, discloses fluorinated acrylate esters which can be used to prepare the foregoing described polymers, which esters contain a terminally hydrogenated carbon atom and an "oxa" atom, i.e., an oxygen atom in place of a carbon atom in the carbon chain of the fluoropolymer. Such esters are illustrated by the compound 1,1,6-trihydro-4-oxa-perfluorohexyl acrylate.

In U.S. Pat. No. 2,826,584, normal 3-perfluoroalkoxy-1, 1-dihydroperfluoropropyl acrylates containing 3 to 6 fully fluorinated carbon atoms in the molecule are described. These monomers do not contain the terminally hydrogenated carbon atom but do possess an oxa oxygen atom in the fluorocarbon chain.

SUMMARY OF THE INVENTION

We have discovered a new class of linear polyperfluoropolyether monomers which can be polymerized to form elastomers.

More particularly, the monomers of the present invention comprise polyfluorinated polyether acrylates, methacrylates, acrylamides and methacrylamides of the formula:

$$A - O(C_3F_6O)_m(CF_2O)_n - CF_2 - Z - CO - CR = CH_2 \quad 1.$$

wherein:
$C_3F_6$ represents a group obtained by the opening of the double bond of a hexafluoropropylene molecule,
$-C_3F_6O-$ and $-CF_2O-$ are repeating oxyperfluoroalkylene units which, when simultaneously present, are distributed randomly along the chain,
$m$ and $n$ may be zero or integers from 1 to 20 with the proviso that $n$ and $m$ cannot both be zero at the same time,
the sum of $m+n$ is an integer from 1 to 20,
A is a $CF_3-$ or $CF_3-O-CF(CF_3)-$ terminal group,
Z is $-CX(Y)O-$ or $-CH_2NR'-$
wherein
  X is a hydrogen or fluorine atom,
  Y is a $CF_3$ group or may be hydrogen but only when X is also hydrogen, and
  R and R' are the same or different and are hydrogen or $CH_3$.

Additionally, we have discovered a new class of primary and secondary polyfluorinated polyether alcohols which can be used to prepare the monomers of the present invention. These alcohols have the formula:

$$A - O(C_3F_6O)_m(CF_2O)_n - D \quad 2.$$

wherein: D is a $-CF_2-CH(OH)-CF_3$ or $-CF_2-CH_2OH$ group, and wherein A, $m$ and $n$ are as above defined.

We have further discovered a new class of elastomeric polymers and a method for preparing such polymers using the monomers of the present invention.

The polymers of the acrylates, methacrylates, acrylamides and methacrylamides of the present invention possess varying molecular weights, depending on the conditions under which the polymer is obtained. The molecular weights, as determined by measurement of the intrinsic viscosity, can vary from a value from about ten thousand to several hundreds of thousands.

These polymers are elastomers and exhibit a range of useful properties. Such polymers are highly flexible at temperatures as low as or lower than $-80°C$, and possess excellent resistance to thermal degradation even in the presence of air at temperatures up to 250°C, excellent oil-repelling properties and resistance to attack by mineral and vegetable oils, a high insolubility in all of the common organic solvents, a high resistance to oxidizing agents, and excellent physical surface properties resulting in surprisingly low values of the critical surface tension of wettability of films prepared from such polymers.

The polymers of the present invention are particularly suitable for imparting soil and moisture resistance to fabrics. Usually, the fabric is impregnated with the polymer of the present invention. Methods for accomplishing such impregnation are well known in the art, the most common being simply dipping the fabric in a solution of the polymer in a suitable solvent and drying the fabric.

Fabrics treated in this manner with the polymers of the present invention not only exhibit high initial water, oil and soil resistance, but also retain the high levels of resistance after repeated washings.

DESCRIPTION OF THE PREFERRED EMBODIMENTS

Preferred acrylate and methacrylate monomers of the present invention may be represented by the formula:

$$A - O(C_3F_6O)_m(CF_2O)_n - CF_2 - CX(Y) - O - CO - CR = CH_2 \quad 3.$$

wherein A, X, Y, R, *m* and *n* are as defined hereinabove.

The above esters are prepared by esterifying acrylic or methacrylic acid with an alcohol of by formula (2) hereinabove. The alcohols having this structure are new compositions and include the following preferred alcohols, as well as homologous products of higher molecular weight, and mixtures thereof:

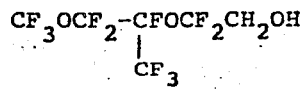  1,1-dihydro-3,6-dioxa-4-perfluoro-methyl-octafluoroheptanol-1

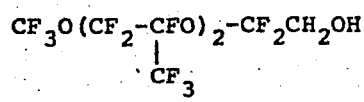  1,1-dihydro-3,6,9-trioxa-4,7-diperfluoromethyl-undecafluoro-decanol-1

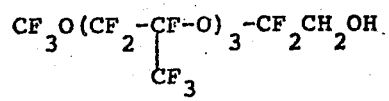  1,1-dihydro-3,6,9,12-tetraoxa-4,7,10-triperfluoromethyl-tetradecafluoro-tridecanol-1

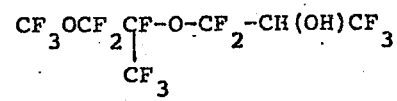  2-hydro-4,7-dioxa-5-perfluoromethyl-undecafluoro-octanol-2

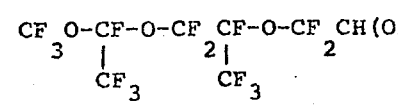  2-hydro-4,7,9-trioxa-5,8-diperfluoromethyl-dodecafluoro-decanol-2

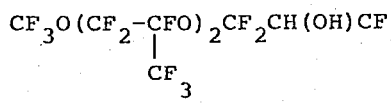  2-hydro-4,7,10-trioxa-5,8-diperfluoromethyl-tetradecafluoro-undecanol-2

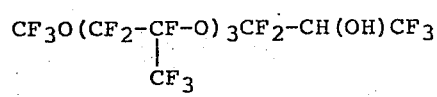  2-hydro-4,7,10,13-tetraoxa-5,8,11-triperfluoromethyl-heptadecafluoro-tetradecanol-2

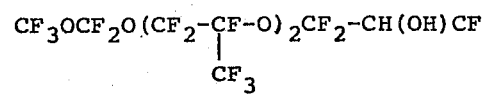  2-hydro-4,7,10,12-tetraoxa-5,8-diperfluoromethyl-hexadecafluoro-tridecanol-2

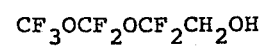  1,1-dihydro-3,5-dioxa-heptafluoro-hexanol-1

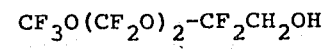  1,1-dihydro-3,5,7-trioxa-nonafluoro-octanol-1

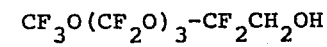  1,1-dihydro-3,5,7,9-tetraoxa-undecafluoro-decanol-1

$CF_3O(CF_2O)_4-CF_2CH_2OH$       1,1-dihydro-3,5,7,9,11-pentaoxa-tridecafluoro-dodecanol-1

The acrylic and methacrylic esters of formula (3) and which are derived from the primary or secondary alcohols of formula (2), can be obtained by using any one of various conventional methods known in the esterification art. Such methods are described, for example, by R. B. Wagner and H. D. Zook, in *Synthetic Organic Chemistry*, J. Wiley, N.Y. 1956, page 479.

In particular, the direct esterification of acrylic and methacrylic acid can be carried out with the alcohols of formula (2) in the presence of a catalyst in an amount between about 0.01 and 5 parts per 100 parts by weight, the catalyst being a strong acid such as sulfuric acid or hydrochloric acid. Alternatively, the esterification can be performed by removing the water produced by the esterification by azeotropically distilling it in the presence of benzene, methylene chloride or chloroform.

The esterification can also be effected by reacting the primary or secondary alcohols with acrylyl or methacrylyl chloride. In this case the esterification can be carried out in the presence or absence of an agent capable of neutralizing the hydrochloric acid produced, e.g., pyridine, triethylamine, or the like.

The present esters can also be obtained by transesterification of methylacrylate or methylmethacrylate with the primary or secondary polyfluorinated alcohols of formula (2). The transesterification can be conducted by operating in the presence of an excess of the fluorinated alcohol and in the absence of solvents and catalysts, and by removing the methanol formed by distillation.

Alternatively, the transesterification is preferably carried out in the presence of catalysts such as the mercuric salts, antimonous trioxide or the titanium tetraalcoholates such as, for example, $Ti(OiC_3H_7)_4$, in amounts between about 0.1 to 5 parts by weight per 100 parts of fluorinated alcohol. The reaction can also be carried out in a dissolving or dispersing medium such as benzene or toluene.

Also within the scope of formula (3) are those acrylates and methacrylates which would appear, on the basis of their structural formulas, to be the products of secondary perfluoropolyether alcohols of the formula:

$$A-O(C_3F_6O)_m(CF_2O)_n-CF_2-CF(OH)CF_3$$

4.

These alcohols, however, are unstable and do not appear in the free state. The acrylates and metacrylates of such perfluoroalcohols may, however, be obtained by using the technique described by A. G. Pittman et al, in "American Chemical Society, Polymer preprints", Sept. 1966, 7 (2), 1093. As described therein, perfluorinated polyether ketones of the formula $$A-O(C_3F_6O)_m(CF_2O)_n-CF_2-CO-CF_3$$

5.

wherein A, *m* and *n* are as defined hereinabove are reacted in an aprotic solvent medium with a stoichiometric amount of an alkali fluoride and then with an acrylyl or methacrylyl chloride or bromide.

The alkali fluoride, (represented by MF) is normally dispersed in an aprotic solvent such as an aliphatic or cycloaliphatic ether, e.g., ethyl ether, butyl ether, dimethyloxyethane, dioxane, tetrahydrofuran or acetonitrile or N,N-dimethylformamide, and is then reacted with the polyether ketone.

An intermediate secondary alkali perfluoro alcoholate is obtained having the structure:

$$AO-(C_3F_6O)_m(CF_2O)_nCF_2-\underset{\underset{CF_3}{|}}{\overset{\overset{F}{|}}{C}}-O\ M+$$

wherein: $M^+$ may be a $K^+$, $Na^+$ or $Ca^+$ ion and wherein A, *m* and *n* are as defined above.

The reaction is carried out at temperatures between 0°C and 100°C, and preferably between about 0°C and 50°C.

The acrylyl or methacrylyl chloride or bromide is then added to this organic suspension at a temperature between about 0°C and 20°C and thereafter the reaction is carried to completion at a temperature between about 20°C and 100°C, to give the esters of the secondary perfluoro alcohols.

The primary and secondary polyfluorinated polyether alcohols of the formula (2) can be prepared by chemical reduction of perfluorinated polyether compounds of the formula:

$$A-O(C_3F_6O)_m(CF_2O)_nB$$

7.

wherein: B is either a $-CF_2-CO-CF_3$ or a $-CF_2-COOR$ group wherein R is a hydrogen atom or an alkyl group containing from 1 to 3 carbon atoms, and the other groups and indices are as defined above.

Various suitable methods may be used to obtain these polyfluoropolyether alchols from the corresponding compounds of formula (7), for example as described by A. M. Lovelace, D. A. Rausch and W. Postelnek in *Aliphatic Fluorine Compounds*, Reinhold P.C., New York 1958 (page 137 and seq.), and by M. Hudlicky in *Chemistry of Organic Fluorine Compounds*, Pergamon Press, London 1961 (page 157 and seq.).

Suitable reducing agents for this reaction are: molecular hydrogen in the presence of catalysts consisting of metals of Group VIII of the Periodic Table of Elements, preferably, those of the group comprising Ni, Co, Pd, Pt, Ru, Os, and Ir. These metals may be used in a finely divided state either alone or supported on inert materials such as carbon or diatomite. Additionally, the metals may be in the form of their oxides such as, e.g., Adams platinum catalyst.

The reduction may be carried out in the presence or absence of liquid solvent or dispersing media such as ethers, cyclic and linear polyethers, acetic acid, alcohols, water, and aliphatic or cycloaliphatic hydrocarbons.

The reaction conditions generally include temperatures between about 0°C and 250°C, preferably between 20° and 200°C. The hydrogen pressure can vary between about 5 and 200 atm. and preferably between about 10 and 100 atm.

Alternatively, the reduction may be carried out in the presence of complex alkali boron, or aluminum tetrahydrides such as, for example, $LiBH_4$, $NaBH_4$, $LiAlH_4$, at temperatures between about 0°C and 100°C and in the presence of ethyl ether, dioxane, dimethoxyethane or, when $NaBH_4$ is the catalyst, water or methanol.

The acrylamides and the methacrylamides of the present invention have the following structural formula:

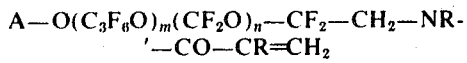

8.

wherein: A, R, R', m and n are as defined above.

These compounds are obtained by reacting either the esters of the formula (7) wherein 'B' is —$CF_2COOR$ or the halides of the corresponding carboxylic acids to transform the terminal functional group, i.e., —COOR or COHal, to an aminic group, and subsequently reacting the amine to obtain the respective acrylamides or methacrylamides.

Specifically, the acid or ester is converted to an amide or a monoalkalylamide and the amide or the monoalkylamide is then chemically reduced respectively to the amine or a monoalkylamine.

Finally these latter two compounds are transformed into the desired acrylamides or methacrylamides.

The foregoing described reactions are illustrated by the following reaction sequence:

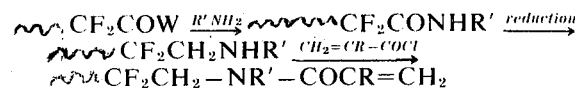

wherein R and R' are as defined above, and W represents a halogen atom or an alkoxy group, such as, e.g., $CH_3O—$ or $C_2H_5O—$.

The amidation reaction, reduction of the amide into a primary or secondary amine, and the transformation of this latter compound into an acrylic derivative, can be carried out according to conventional methods described, for instance, by A.B. Wagner and M.P. Zook, in *Synthetic Organic Chemistry*, J. Wiley, New York (1953) and by A.M. Lovelace, D.A. Rausch, and W. Postelnek, in *Aliphatic Fluorine Compounds*, Reinhold P.C., New York (1958). More particularly, the amides or the N-alkylamides of these perfluorinated acids can be prepared in quantitative yields, starting from the acyl chlorides or fluorides thereof or from the esters thereof, by reacting these compounds with gaseous ammonia or with primary amines, in the absence or presence of solvents such as aliphatic or alicyclic ethers, at temperatures from about 0°C to about 30°C.

The reduction of the amides into amines can be carried out, usually with very high or quantitative yields, by means of alkali boron or aluminum tetrahydrides, such as $LiAlH_4$, in an ethyl ether solution at temperatures between about 0°C and 30°C. The primary and secondary amines obtained react easily and quantitatively with the acrylyl or methacrylyl chloride in ethyl ether solutions and in the presence of a basic substance, such as triethylamine or pyridine.

The polyester perfluoroketones, perfluoroacids and perfluoroesters of formula (7) may be obtained by the methods described in Italian Pat. Nos. 789,221, 773,214, 774,001 and 773,920.

The acrylates, methacrylates, acrylamides and methacrylamides of the present invention are easily polymerized by free radical polymerization. Bulk polymerization as well as polymerization in solution, suspension or emulsion can be used for this purpose.

Suitable free radical initiators are selected from the group comprising azo-bis-isobutyronitrile, benzoylperoxide, di-tert.-butylperoxide, the borotrialkyls and oxygen, and the persulfates in the presence or absence of ferrous sulfate.

Suitable solvents or dispersants include water, ethers, hydrocarbons, N,N-dimethylformamide, dimethylsulfoxide, etc. If desired, the polymerization can be promoted by photochemical methods.

Generally, the polymerization temperatures vary between about −80°C, as in the case of borotrialkyl and oxygen, and about +120°C. The polyacrylates and polymethacrylates of the primary and secondary polyfluoro alcohols represented by formula (2) and the polyacrylamides and polymethacrylamides of the perfluoropolyether amines can also be obtained from polymeric intermediates.

Thus, the polymers may be obtained by transesterification or amidation of the methyl polyacrylate or polymethacrylate by a process analogous to the transesterification and amidation of the monomeric esters. Particularly, the methyl polyester dissolved in toluene can be reacted with an excess of polyfluorinated alcohol, in the presence of a $Ti(OiC_3H_7)_4$ catalyst or toluenesulfonic acid, or with an excess of a polyfluoropolyether amine.

Either the acrylyl or methacrylyl polychloride can be esterified or amidized in a solution of, for example, dioxane, with the polyfluorinated amine or the alchol in the presence of a basic agent.

While not wanting to be held to any specific theory or mode of operation of the present invention, it is generally believed that the properties of the polymers of the present invention result from the presence of the polyether structure forming the side groups of the polymeric chain. It is thought that the exceptional flexibility of the polymeric products, even at low temperatures, is due to the rotational freedom of the ether oxygen atoms in the side group wherein each ether oxygen is positioned adjacent to 1 or 2 carbon atoms, as occurs more particularly when the polyether side chain groups attached to the main polymer chain contain one or more difluoromethylene oxide units, while the hexafluoropropylene oxide unit can be either present or not.

These desirable properties also occur in copolymeric products wherein at least half of the acrylic or methacrylic units are bound to a residue containing the linear polyfluoro polyether structure. Said properties are markedly enhanced when, in the chains of copolymeric nature, more than about 80% of acrylic or methacrylic units are bound to a residue containing a linear polyfluoropolyether structure.

The following examples illustrate the present invention:

EXAMPLE 1

A solution of 100 g of pure $CF_3OCF_2—CF(CF_3)OCF_2—COOH$ acid (b.p. = 166°C – 168°C) diluted in 100 cc of ethyl ether was slowly added dropwise to a 1000 cc glass flask, provided with a stirrer, a water-cooled reflux condenser, and a dropping funnel, containing 10 g of LiAlH$_4$ dispersed in 500 cc of anhydrous ethyl ether and maintained at 0°C. The temperature was raised until the ether refluxed and then the mixture was stirred for 2 hours. At the end of this period, the mixture was cooled to 0°C, and then 50 cc of H$_2$O and then 50 cc of 20% H$_2$SO$_4$ were slowly added dropwise, to decompose and dissolve the solid compounds.

The organic layer was then separated, dried with anhydrous calcium sulfate (Drierite) and, after removal of the ethyl ether by distillation, the residue was subjected to rectification at atmospheric pressure. A 70 g fraction having a boiling temperature of 129°C – 131°C and a density of $d_4{}^{24} = 1.696$ was separated. Gas-chromatographic analysis indicated that the component was more than 98% pure. The elemental analysis of this compound corresponded to the formula: C$_6$H$_3$F$_{11}$O$_3$. The I.R. absorption spectrum analysis indicated the presence of the C—H bond in the 2900 – 3000 cm$^{-1}$ zone and in the 1440 cm$^{-1}$ zone, and the -OH group in the 3350 cm$^{-1}$ zone, while the absorptions at 1790 cm$^{-1}$, characteristic of the —COOH group, were absent.

The structure CF$_3$OCF$_2$—CF(CF$_3$)OCF$_2$—CH$_2$OH for this compound was confirmed by N.M.R. analysis.

A 30 g sample of the alcohol thus prepared, in the presence of 4.1 g of triethylamine and 25 cc of ethyl ether, was reacted with 8.1 g of CH$_2$=CHCOCl at a temperature of 0°C. The reaction mass was maintained for 4 hours at 35°C, after which it was poured into water. The organic layer was separated and washed with an 0.5% solution of NaHCO$_3$ and then dried with Na$_2$SO$_4$ and rectified in a microdistiller. At 40°C/l mm Hg, 15 g of a product were collected which possessed an elemental percentage composition corresponding to the formula: C$_9$H$_5$F$_{11}$O$_4$.

The analysis of the I.R. absorption spectrum showed absorptions at 1730 cm$^{-1}$, and at 1640 cm$^{-1}$ that are characteristic of the carboxylic group and of vinyl unsaturation, respectively, indicating that the product has the structure:

CF$_3$O-CF$_2$-CFOCF$_2$CH$_2$OCOCH=CH$_2$.
    |
    CF$_3$

A 10 g sample of this product was placed into a 25 cc glass vial fitted with a side inlet for the introduction of the reactants under a nitrogen atmosphere. 0.2×10$^{-3}$ g moles of B(iC$_4$H$_9$)$_3$ dissolved in 5 cc of benzotrifluoride were added. 2 cc of gaseous O$_2$ were then introduced into the vial under vacuum. The vial was then sealed and kept at a thermostatically set temperature of 30°C for 4 hours.

At the end of this period, the vial was opened and the contents were poured into methanol. A heavy, coagulated product was obtained which was separated from the solvent, washed and dried. 8 g of an amorphous, transparent polymer were obtained. This polymer softened at 30°C and was insoluble in ethyl ether, acetone, dioxane, ethyl acetate, and dimethylformamide, while it was soluble in methylperfluorobutyrate and phenylfluoroform. Its intrinsic viscosity determined in phenylfluoroform at 90°C was 0.15 (100 cc/g).

A solution of 3% of the polyacrylate in methylperfluorobutyrate was spread over a clean, degreased glass plate and a film of polymer deposited on the glass due to slow evaporation of the solvent. The contact angle formed on the surface of the film thus obtained was determined for a number of pure liquids of the n-alkane series having a known surface tension, e.g., hexadecane and heptane. From these angles the value of the surface tension, $\gamma_{sd} = \gamma_c = 14$ (dyne/cm), defined as the critical surface tension, was calculated by means of the Fowkes method (see F. M. Fowkes in *Contact angle, wettability and Adhesion* Adv. Chem. series No. 43, A. C. S., Washington 1964 page 99, wherein $\gamma_c$ as critical surface tension of wetting and $\gamma_{sd}$ as surface tension of solid substrate due to London dispersion forces are defined).

A sample of woolen fabric was impregnated with a solution of 3% of the polyacrylate in benzotrifluoride, by dipping and wringing out twice, the absorption in the wet state being 85%. Thereupon the fabric was dried by hanging it in a flowing air oven at 110°C. A sample of the fabric thus treated and containing 1.5% of the polyacrylate was evalulated for oil-repellency using a mixture of 40% by volume of Nujol mineral oil (Saybolt viscosity 360-390/38°C) and 60% by volume of n-heptane, at 20°C (see J. H. Simmons in "Fluorine Chemistry, Academic Pr.", New York 1964, vol. 5, page 402). The fabric did not absorb any of this mixture.

Another sample of the treated fabric was subjected to a water-repellency test (AATCC method, No.22, 1961). The water-repellancy value thus determined was about 80.

EXAMPLE 2

A sample of 100 g of

A sample of 100 g of 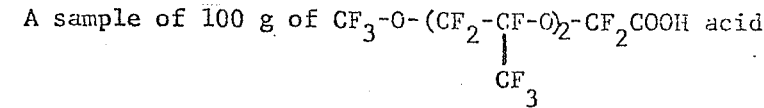 acid acid was reduced with LiAlH$_4$(10 g) in ethyl ether (500 cc) at 0°C, using the same apparatus and operating procedure as described in Example 1.

Using the same procedures described hereinabove, after fractional distillation, 60 g of product were obtained having an elemental analysis corresponding to the formula: C$_9$H$_3$F$_{17}$O$_4$ and a boiling point range of 166°-167°C/760 mm Hg. The I. R. spectrum showed absorption bands at 2900-3000 cm$^{-1}$; at 1440 cm$^{-1}$ and 3350 cm$^{-1}$. The N. M. R. analysis confirmed the

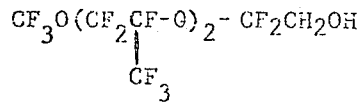

structure.

This product, at concentrations less than 0.1%, reduced the surface tension of water to 18 dyne/cm.

44 g of the described alcohol were reacted with 15 cc of acrylyl chloride in the presence of 0.5 g of anhydrous BaCl$_2$ for 6 hours at 60°C. The unreacted acrylyl chloride was removed by distillation and the residue was washed first with 100 g of water and ice, and then with a 0.5% aqueous solution of NaHCO₃. The washed residue was dried over Na₂SO₄ and distilled under a vacuum of 0.2 mm Hg. 40 g of a product were collected at 60°–63°C. The elemental and N. M. R. analyses of the product indicated the formula to be:

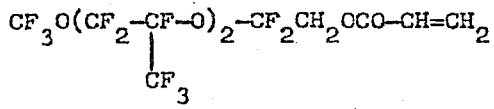

20 g of this product were polymerized by heating for 8 hours at 70°C, in the presence of 0.05 g of azo-bis-isobutyronitrile. 12 g of a polymer were obtained which was insoluble in acetone and CF₂Cl—CFCl₂, but soluble in phenylfluoroform and in methylperfluorobutyrate. In the latter solvent the intrinsic viscosity of 0.28 dl/g was determined at 40°C.

By determining the contact angle with hexadecane on a film of the polymer spread on a glass plate according to the technique described in Example 1, the surface tension was calculated to be $\gamma_{sd} = \gamma_c = 15$ (dyne/cm).

The oil-repellency test was carried out according to the technique described in Example 1 on a woolen fabric containing 1.5% of the polyacrylate of 1,1-dihydro-3,6,9-trioxa-4,7-diperfluoromethyl-undecafluoro-decanol-1.

Thus tested, the fabric was completely repellent towards a mixture consisting of 30% by vol. of Nujol mineral oil and 70% by vol. of n-heptane.

Another sample of the same fabric containing 1.5% of the polyacrylate was subject to the water repellency test (AATCC method, No. 22, 1961). A water repellency value of about 90 was thus determined.

EXAMPLE 3

A sample of 50 g of

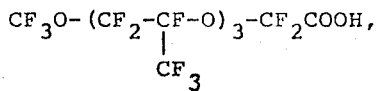

having a boiling point of 220°C, was reacted for 15 hours at 80°C, in a 250 cc autoclave, in the presence of 1 g of PtO₂, with hydrogen under a pressure of 40 atm. 30 g of CF₃O(C₃F₆O)₃CF₂—CH₂OH, having a boiling point of 194°C – 196°C were obtained. The structure of the alcohol was confirmed by I. R. and N. M. R. analyses.

10 g of the alcohol were reacted with a stoichiometric amount of acrylyl chloride under the same conditions as in Example 1. 7 g of the corresponding acrylate, having a boiling point of 95°C – 97°C at 1 mm Hg., were obtained. The acrylate was then polymerized at 80°C for 5 hours in the presence of 0.05 g of benzoyl peroxide. The polymer's intrinsic viscosity determined in methylperfluorobutyrate at 40°C was 0.25 dl/g. The surface tension of the polymer was $\gamma_{sd} = \gamma_c = 15.5$ (dyne/cm), as determined on a film of the polymer according to the Fowkes method, as described in Example 1.

EXAMPLE 4

10 g of the

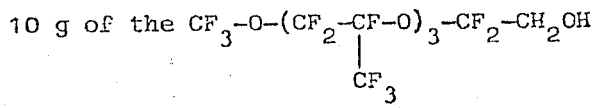

obtained in Example 3 were reacted with a stoichiometric amount of methacrylyl chloride, under the same conditions as in Example 1, to give 6.5 g of the corresponding methacrylate, having a boiling point of 110°–112°C at 0.5 mm Hg. The methacrylate was polymerized at 50°C in the presence of 0.2% of azo-bis-isobutyronitrile for a period of 7 hours. The polymer, which had an intrinsic viscosity of 0.3 dl/g in methyl-perfluorobutyrate at 40°C, possessed a surface tension $\gamma_{sd} = \gamma_c$ of about 16 (dyne/cm) as determined by the Fowkes method as described in Example 1.

A sample of cotton treated with a 3% solution of the polymethacrylate in benzotrifluoride and dried in a flowing air oven at 110°C contained 1% of the polymer. This sample was subjected to the oil-repellency test according to the technique described in Example 1, and was completely oil repellent towards a mixture of 30% Nujol and 70% n-heptane.

EXAMPLE 5

100 g of a mixture of acids having the average formula:

wherein the sum of the indices $m$ and $n$ is from 1 to 4, with an average ratio $m/n = 3$, and having an average equivalent acidimetric weight of 515, were reduced for 15 hours with H₂ at 40 atm on PtO₂ in an autoclave at 80°C. The corresponding mixture of alcohols obtained had a boiling temperature range between 120°C and 210°C at 755 mm Hg.

A sample of 80 g of the mixture of alcohols was esterified by reacting it with 20 g of acrylyl chloride in the presence of 5 g of anhydrous BaCl₂. After washing with H₂O and sodium bicarbonate and drying over Na₂SO₄, the product was distilled under a vacuum of 0.01 mm Hg, and a 65 g fraction was collected, this fraction having a boiling temperature in the range between 30°C and 70°C and having the average formula:

wherein $m$ and $n$ are defined above.

50 g of this acrylate mixture were polymerized in the presence of benzoylperoxide (0.2 g) at 80°C, for a period of 12 hours. After extraction with ethyl ether, 31 g of polymer were obtained.

This polymer had a rubbery appearance and was insoluble in dioxane and butyrolactone and slightly soluble in benzotrifluoride and methylperfluorobutyrate. A sample of this polymer began to thermally decompose at 325°C as determined in air with a 59 ADAMEL thermobalance.

The glass transition temperature of the polymer as determined with a Differential Scanning Calorimeter P.E. DSC 1 was between −90°C and −85°C. The surface tension of the polymer was $\gamma_{sd} = \gamma_c = 14.5$ (dy-

EXAMPLE 6

50 g of the ketone

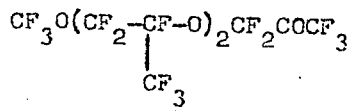

(b.p. 136°C) and 5 g of carbon containing 0.5% of Pd were introduced into a 100 cc Inox steel autoclave. The contents were put under vacuum and then $H_2$ was introduced until the pressure was 50 atms. The mixture was reacted for 10 hours at 40°C. At the end of the reaction, the hydrogen was discharged, the reaction product was filtered from the catalytic residue and the product was then rectified, collecting the fraction that boils between 164°–165°C at 752 mm Hg (40 g).

The I. R. and N. M. R. spectra of this product corresponded to the formula:

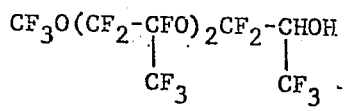

30 g of this alcohol were reacted with 10 g of acrylyl chloride in the presence of 2 g of anhydrous $BaCl_2$. After hydrolysis of the acyl chloride with an excess of water and sodium bicarbonate and drying with $Na_2SO_4$, 28 g of the acrylate

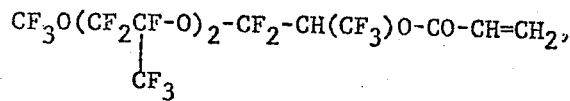

b.p. 111°–113°C at 15 mm Hg, were obtained.

25 g of this acrylate were polymerized in the presence of $0.2 \times 10^{-3}$ g moles of $B(nC_4H_9)_3$ and 2 cc of oxygen, at 30°C, in 250 cc of benzotrifluoride.

The monomer solution was 70% polymerized after 8 hours of reaction. At this point the polymerization was stopped by blowing in air, and the solution of the polymer and monomer was used for impregnating a sample of a cotton fabric. The intrinsic viscosity of the polymer as determined in phenylfluoroform at 90°C was 0.2 dl/g.

After wringing and drying in a ventilated oven at 110°C, the oil-repellency test was carried out as described in Example 1. A fabric containing about 1.2% of the polyacrylate was completely repellent to a mixture of 50% Nujol and 50% by vol. n-heptane.

A film of the polymer was prepared by evaporation of a 5% solution of the polymer in methylperfluorobutyrate on glass. The contact angle formed with hexadecane was then determined and, using the Fowkes method, the value of the surface tension $\gamma_{sd} = \gamma_c$ was calculated to be about 13 (dyne/cm).

EXAMPLE 7

40 g of $CF_3O(CF_2O)_3CF_2COOCH_3$ ester dissolved in 50 cc of anhydrous ethyl ether were slowly added to a suspension of 4 g of $LiAlH_4$ in 250 cc of ethyl ether in a 1 liter flask provided with a reflux condenser and mechanical stirrer. Then 20 cc of $CH_3OH$ were carefully added and then 50 cc of 25% $H_2SO_4$ were added to dissolve the decomposition products of the hydride. The organic solution was separated, the residue was washed with water and dried over $Na_2SO_4$; then the ethyl ether was distilled and the residue distilled under vacuum. 32 g of an alcohol having the formula $CF_3O(CF_2O)_3CF_2C-H_2OH$ and boiling at 37°–39°C at 0.5 mm Hg were collected.

30 g of this alcohol were reacted with a mixture of 100 g of methylacrylate, 0.5 g of mercuric sulfate, 1 cc of $H_2SO_4$ and 0.5 g of phenothiazine, in a 250 cc flask provided with an 8 mm diameter rectification column, filled with Helipack for a length of 30 cm. The mixture was reacted at a reflux ratio of 5:1, a temperature of 60°–61°C, and under a pressure of 750 mm Hg. During the reaction, a mixture of methanol and methyl acrylate was withdrawn. Lastly, the excess of methylacrylate was removed by distillation. The 1,1-dihydro-3,5,7,9-tetraoxa-perfluorodecanol-1-acrylate was then distilled under vacuum and the fraction boiling at 60°–65°C and 0.3 mm Hg was collected.

20 g of the acrylate comprising this fraction were polymerized in the presence of 0.2 g of benzoylperoxide at a temperature of 80°C, for 5 hours. The polymer obtained had a gummy consistency and an intrinsic viscosity of 0.31 dl/g in methylperfluorbutyrate at 40°C.

The surface tension $\gamma_{sd} = \gamma_c$ of the polymer was 13.5 (dyne/cm), as determined on a film of the polymer obtained from a 3% solution of the polymer in benzotrifluoride, using the Fowkes method. A sample of cotton fabric was impregnated by dipping in a 3% solution of the polyacrylate in methylperfluorobutyrate. After wringing and drying the sample fabric at 110°C in a ventilated oven, the fabric, containing 1.2% of polymer, was tested for oil-repellency according to the method described in Example 1. The fabric was completely oil-repellent towards a mixture of 50% by volume of Nujol and 50% by volume of n-heptane.

EXAMPLE 8

The ketone having the formula

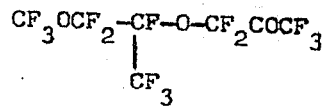

(b.p. = 85°–86°C) was distilled over $P_2O_5$.

0.12 g mole of the freshly distilled ketone was introduced into a 500 cc glass flask which was provided with a stirrer and a dropping funnel, contained a mixture of 7 g of anhydrous potassium fluoride in 100 cc of anhydrous N,N-dimethylformamide and the contents of which were thermostatically maintained at 0°C.

This mixture was treated for 2 hours at 0°C, and then, over a 3-hour period, the temperature was raised to 60°C, to give a homogenous solution of the potassium perfluoroalcoholate in the solvent.

The solution was then again cooled to 0°C, after which 0.12 g mole of acrylyl chloride was slowly added. During the addition of the acrylyl chloride, potassium chloride formed and precipitated from the solution. At the end of the addition, the temperature was again raised to 50°C over a period of 3 hours in order to complete the reaction. Thereupon the mixture was poured into 500 g of water and ice, the organic layer was washed with water and then, after drying over $Na_2SO_4$, the mixture was rectified. 40 g of a product boiling at 70°C – 72°C under 15 mm Hg. were collected. The elemental percent analysis, the I.R. spectrum and the N.M.R. spectrum indicated the structure of the product to be:

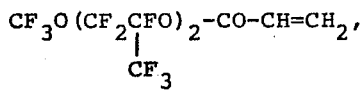

which may also be written as:

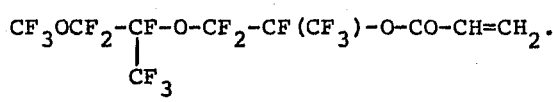

10 g of this acrylate were polymerized by heating for 10 hours at 80°C in the presence of 0.2 g of benzoylperoxide. After precipitation in methanol and drying under a vacuum of 15 mm Hg. at 50°C, 6 g of a polymer were obtained, this polymer having a intrinsic viscosity as determined in methylperfluorobutyrate at 40°C of 0.26 dl/g. A film of this polymer was deposited on a glass plate from a 3% solution of the polymer in benzotrifluoride. The contact angle with hexadecane on this film was then determined. The surface tension, calculated according to the Fowkes method as described in Example 1, was $\gamma_{sd} = \gamma_c = 12.8$ (dyne/cm).

EXAMPLE 9

100 g of an equimolar mixture of acids having the formulae $CF_3O—CF_2O—CF_2COOH$ and $CF_3O(CF_2O)_2CF_2COOH$, the mixture having a boiling point between 135°C and 156°C at a pressure of 755 mm Hg, dissolved in 100 cc of anhydrous ethyl ether, were added to a mixture of 25 g of $LiAlH_4$ in 800 cc of anhydrous ethyl ether, contained in a 2 liter flask. The mixture was then allowed to react for 5 hours at reflux temperature. Thereupon the excess of the reducing agent was decomposed by slowly adding to the mixture, which was cooled to 0°C, 50 cc of methanol followed by 100 cc of 20% $H_2SO_4$.

The contents of the flask were then poured into water, and the organic phase was washed with water and then dried with $Na_2SO_4$. The solvent was removed by distillation. On distillation at a temperature of from 105° to 135°C, 85 g of a mixture of the alcohols $CF_3O—CF_2O—CF_2CH_2OH$ and $CF_3O(CF_2O)_2CF_2CH_2OH$ were obtained. 50 g of this mixture were reacted at 50°C with 30 g of acrylyl chloride in the presence of 2 g of anhydrous $BaCl_2$. After 5 hours of reaction, the reaction mass was poured into water and sodium bicarbonate, and the organic solution was washed with water and then dried over $Na_2SO_4$. The residue was rectified, and 30 g of a fraction boiling between 35°C and 45°C at 15 mm Hg were collected.

10 g of this fraction were polymerized in solution in 20 cc of methylperfluorobutyrate in the presence of 0.2 g of azo-bis-isobutyronitrile for 15 hours at 60°C. The polymerization yield was 70% as determined by gravimetric analysis.

The polymer had an intrinsic viscosity as determined in methylperfluorobutyrate at 40°C of 0.35 dl/g and a surface tension $\gamma_{sd} = \gamma_c$ of 14(dyne/cm) according to the Fowkes method described in Example 1.

EXAMPLE 10

100 g of a mixture of 90 parts of the ketone having the formula

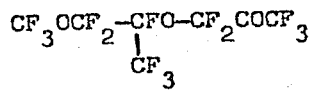

and 10 parts of the ketone having the formula

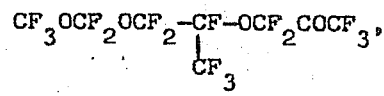

the mixture having a boiling range of from 85°C to 115°C (755 mm Hg), were slowly introduced into a 500 cc glass flask containing 14.5 g of KF. This mixture was dispersed, with stirring, in 300 cc of anhydrous dimethoxyethane, thermostatically stabilized at 0°C.

The mixture was reacted at temperatures between about 0°C and 50°C until the reaction mixture was completely dissolved (5 hours). The mixture was cooled to 0°C and 21 g of acrylyl chloride were added with stirring over a 1-hour period. The solution was then allowed to react for 3 more hours at 50°C.

The mixture was then poured into water and ice and the organic layer, after repeated washing with water and drying over $Na_2SO_4$, was rectified. The fraction boiling between 60° and 80°C under a vacuum of 15 mm Hg (60 g) was collected.

50 g of this mixture of acrylates were placed under a nitrogen atmosphere in a quartz test tube immersed in a water bath thermostatically stabilized at a temperature of 30°C. The mixture was then polymerized by U.V. radiation using an original Hanau Q 81 quartz U.V. lamp, placed inside the water bath and arranged parallel and coaxially to the test tube.

After 5 hours exposure, the radiation was stopped and the unreacted monomer (20 g) was removed by evaporation at 80°C under a 1 mm Hg. vacuum. The polymer, whose intrinsic viscosity in methylperfluorobutyrate at 40°C was of 0.15 dl/g. was dissolved in 1 liter of methylperfluorobutyrate. Samples of cotton and wool fabrics impregnated with this solution were completely repellent towards a liquid mixture consisting of 60 parts by volume of Nujol oil and 40 parts of n-heptane.

EXAMPLE 11

3 cc of freshly distilled acrylyl chloride and a solution of 50 mg of azo-bis-isobutyronitrile in 3 cc of anhydrous dioxane, were introduced into a 50 cc glass test tube under an atmosphere of dry nitrogen. The mixture was thermostatically stabilized at 50°C and was then allowed to react for 50 hours. At the end of the polymerization, the dioxane and the unreacted monomer were evaporated under vacuum. 2 g of polymer were obtained, which were dissolved in 25 cc of anhydrous dioxane and then admixed with a solution of 12 g of the alcohol having the formula $CF_3O—(C_3F_6O)_2CF_2CH_2OH$ in 10 cc of anhydrous dioxane which contained 2.5 g of triethylamine.

The solution was reacted for 5 hours at reflux temperature. The reaction mixture was then poured into methanol and 12 g of polymer were obtained. This polymer possessed a carbon content of 26.2%, which corresponds to a polyacrylate in which about 95% of the carboxyl groups are esterified with the fluoropolyether alcohol.

This polymer was soluble in methylperfluorobutyrate. A 0.5% solution of the polymer in methylperfluorobutyrate at 30°C possessed a viscosity of 0.35 (100 cc/g).

The contact angle of hexadecane on a film of this polymer was determined and the surface tension, calculated according to the Fowkes method as described in Example 1, was $\gamma_{sd} = \gamma_c = 16.9$ (dyne/cm).

EXAMPLE 12

2 of methylpolyacrylate, 10 cc of toluene, 0.1 g of Ti-$(OiC_3H_7)_4$ and 20 g of the alcohol having the formula $CF_3O(C_3F_6O)_2CF_2CH_2OH$ were introduced into a 50 cc flask equipped with an 8×300 mm rectification column filled with Fenske rings. The mixture was refluxed for 2 hours, after which liquid was drawn off from the head of the column at a rate of about 0.5 cc/hour. After 10 hours, 5 cc of toluene and 5 g of the polyether alcohol were added to the flask and the reaction was carried out for another 10 hours in the presence of 0.1 g of fresh catalyst. At the end of this period, the reaction mass was poured into methanol. After drying, 11.5 g of polyacrylate which possessed a carbon content of 26.5% were obtained, indicating that 90% of the carboxyl groups were esterified with the fluorinated alcohol. This polymer showed an intrinsic viscosity of 0.55 dl/g as determined in methylperfluorobutyrate at 40°C.

The contact angle with heptane on a film of this polymer, obtained from a solution of the polymer in methylperfluorobutyrate, was measured. A surface tension of $\gamma_{sd} = \gamma_c = 18$ (dyne/cm) was calculated using the Fowkes method.

EXAMPLE 13

A solution of 30 g of the ester having the formula $CF_3O(C_3F_6O)_5CF_2COOCH_3$ in 50 cc of $CF_2Cl-CFCl_2$ was slowly added over a 3 hour period to a mixture of 2 g of $LiAlH_4$ and 250 cc of anhydrous ethyl ether in a 500 cc flask provided with a reflux condenser and a mechanical stirrer.

The mixture was reacted at 0°C for 3 hours and then for 3 hours at reflux. Thereafter the excess $LiAlH_4$ was decomposed with water and 10% $H_2SO_4$. The ether layer was washed with water until the washings were neutral. The organic solution was dried over $Na_2SO_4$, the ethyl ether was removed by distillation and the residue was vacuum distilled. 24 g of a fraction having a b.p. between 130°C and 135°C at 0.2 mm Hg were obtained. The elemental analysis and the I.R. spectrum of the fraction corresponded to the formula $CF_3O(C_3F_6O)_5CF_2CH_2OH$.

10 g of this alcohol was reacted with 1.5 g of $CH_2=CHCOCl$ in 30 cc of ethyl ether in the presence of 3 cc of $(C_2H_5)_3N$.

The reaction was carried out under stirring at 0°C for 2 hours. Thereafter, the entire reaction mixture was poured into 50 g of ice water and the organic solution was separated and dried over $Na_2SO_4$. The solvent was distilled under vacuum, leaving the pure acrylic ester as the residue.

The I.R. spectrum of the residue showed absorptions attributable to the carboxy group and vinyl saturation characteristic of the $CF_3O(C_3F_6O)_5CF_2CH_2OCOCH=CH_2$ structure.

5 g of the acrylic ester were polymerized in solution in 20 cc of methyl perfluorobutyrate in the presence of 0.05 g of azo-bis-isobutyronitrile for 15 hours at 60°C. At the end of the reaction, the polymer was coagulated by pouring the reaction mixture into 100 cc of acetone. The polymer was then separated and dried. 3.2 g of dried polymer having an intrinsic viscosity as determined in methylperfluorobutyrate at 40°C of 0.22 dl/g were obtained.

A film of this polymer was obtained by evaporation of a 2% solution of the polymer in methyl perfluorobutyrate on a glass plate.

From the contact angle data from this film, a surface tension of $\gamma_{sd} = \gamma_c$ of about 13 (dyne/cm) was calculated, using the Fowkes method.

EXAMPLE 14

A sample of 30 g of a mixture of acids having the average formula $CF_3O(CF_2O)_n(C_3F_6O)_mCF_2COOH$, in which the sum of the indices $n+m$ is from 2 to 14 and the value of the average of the ratio $m/n$ is about 3, and which has an average equivalent acidimetric weight of 860, was added to a mixture of 100 cc of ethyl ether, 30 cc of $CF_2Cl-CFCl_2$, and 2 g of $LiAlH_4$. The reaction was carried out for 3 hours at a temperature of 0°C. The temperature was then raised to 35°C.

After 4 hours at this temperature, the excess of $LiAlH_4$ was decomposed with water and 10% $H_2SO_4$. The organic layer was separated, washed with water until the washings were neutral, and then dried over $Na_2SO_4$. The solvents were removed by distillation, leaving behind the mixture of the corresponding alcohols as a residue.

10 g of the mixture of alcohols in a mixture of 20 cc of ethyl ether, 10 cc of $CF_2Cl-CFCl_2$, and 3 cc of $(C_2H_5)_3N$, were reacted at 0°C with 1.3 g of $CH_2=CH-COCl$ dissolved in 10 cc of ethyl ester.

The reaction was carried out at 0°C for 2 hours. The reaction product was poured into 50 g of ice water, and the organic phase was separated and washed with water until the washings were neutral. The solvents were removed by evaporation, leaving as a residue the mixture of fluorinated acrylic esters.

5 g of this mixture of acrylic esters dissolved in 10 cc of a 1:1 mixture of ethylacetate and $CF_2Cl-CFCl_2$ were polymerized in the presence of $0.1 \times 10^{-3}$ g moles of $B(iC_4H_9)_3$ and 1 cc of oxygen at 30°C for 10 hours.

The polymer thus obtained was coagulated by pouring the mixture into 100 cc of acetone. After washing with acetone and drying, 2.5 g of polymer having an intrinsic viscosity as determined in phenylfluoroform at 90°C of 0.32 dl/g were obtained.

A polymer film was prepared by evaporating a 1% solution of the polymer in methylperfluorobutyrate on a glass plate. Using the contact angle data obtained from the film, a surface tension $\gamma_{sd} = \gamma_c=$ about 12 (dyne/cm) was calculated using the Fowkes method as described in Example 1.

EXAMPLE 15

54 g of the perfluoropolyether ketone having the formula $CF_3O(C_3F_6O)_4CF_2COCF_3$ were slowly added to a suspension of 3.5 g of anhydrous KF in 50 cc of dimethylformamide at a temperature of 0°C.

After 2 hours at room temperature, the solution became homogenous; it was then cooled to 0°C and a solution of 5.4 g of $CH_2=CH-COCl$ in 10 cc of dimethylformamide was added. This mixture was allowed to react for 1 hour at 0°C and for 2 hours at room temperature. The reaction mixture was then poured into 50 g of icy water, and the organic layer was separated and washed twice with 10 cc of water. The organic solution was then diluted with 50 cc of $CF_2Cl-CFCl_2$ and was dried over $Na_2SO_4$. After the solvent was evaporated, 35 g of a residue were obtained. The I.R. spectrum corrsponded to the structure $CF_3O(C_3F_6O)_5$-$COCH=CH_2$.

After dissolving 10 g of the acrylate in 10 cc of a mixture of 50% of $CF_2Cl-CFCl_2$ and ethylacetate, the acrylate was polymerized with $0.15 \times 110^{-3}$ g moles of $B(iC_4H_9)_3$ in the presence of 1.5 cc of oxygen at 30°C for 6 hours.

At the end of the reaction, the polymer was coagulated by pouring 100 cc of acetone into the reaction mixture. After filtering and drying, 4.1 g of polymer were obtained, this polymer having an intrinsic viscosity as determined in phenylfluoroform at 90°C of 0.25 dl/g. A film was prepared from a 1% solution of this polymer in methylperfluorobutyrate. The surface tension $\gamma_{sd} = \gamma_c = 12.2$ (dyne/cm) was determined from the contact angle data from the film using the Fowkes method.

EXAMPLE 16

55 g of

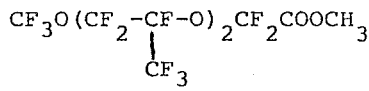

(b.p. 161°-162°C) dissolved in 50 cc of ethyl ether were introduced into a 100-cc glass flask provided with a reflux condenser and a dipping pipe for feeding gases. A flow of $NH_3$ gas was bubbled into this solution at 0°C for 30 minutes. At the end of the bubbling, the solvent and the methyl alcohol were removed by evaporation. The solution was then diluted with an additional 20 cc of ethyl ether and this solution, containing the amide, was added with stirring, to a suspension of 6 g of $LiAlH_4$ in 300 cc of anhydrous ether, at 0°C over a one hour period. The mixture was then refluxed for 3 hours.

After this period, the mixture was cooled to 0°C and 10 cc of methanol were added to it over a 15 minute period. Then the mixture was poured into 100 g of ice and water and, to the suspension thus obtained, 20 g of a 40% NaOH solution were added, while stirring the suspension to assure complete dissolution of the inorganic salts.

The ether layer was then separated and the inorganic layer was extracted with an additional 50 cc of ethyl ether. The ether layers were combined and dried over $K_2CO_3$. The solvent was then evaporated and the residue distilled. 27 g of a fraction boiling at 152°C - 153°C were obtained. The product was assigned the structure

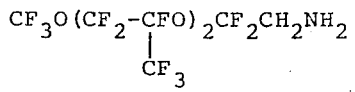

on the basis of the I.R. absorptions due to the N—H stretching (3200 - 3400 $cm^{-1}$) and C-H stretching (2900 $cm^{-1}$) and N—H bending (1625 $cm^{-1}$) absorptions. No absorptions in the 1700 - 1800 $cm^{-1}$ zone, characteristic of the starting ester carbonyl group and of the amide, were observed.

4.5 cc of acrylyl chloride dissolved in 40 cc of ether were added to a solution of 20 g of the amine having the formula $CF_3O(C_3F_6O)_2CF_2CH_2NH_2$ and 8 cc of triethylamine in 200 cc of ethyl ether, maintained at 0°C.

This mixture was reacted for 3 hours at 0°C and then for 3 hours at 25°C, with stirring, during which time the chlorohydrate of triethylamine separated out of the mixture. It was filtered from the amine chlorohydrate, and the ether solution was washed with water and then dried over $Na_2SO_4$. After concentration and distillation, 18 g of a fraction having a b.p. range between 85°C – 90°C at 0.5 mm Hg. (233°C/760 mm) were obtained.

This product was assigned the structure $CF_3O(C_3F_6O)_2-CF_2CH_2-NHCOCH=CH_2$ on the basis of the I.R. absorptions due to N—H bonds in the 3200 $cm^{-1}$ zone, to the C—H bonds at 3000 $cm^{-1}$, to the amide group in the 1670 and 1550 $cm^{-1}$ zone, and the absorptions in the 1600 - 1650 $cm^{-1}$ zone due to the N—H and the double bond.

10 g of the acrylamide were polymerized under a nitrogen atmosphere at 70°C, in the presence of 0.04g of azo-bis-isobutyronitrile. After 20 hours, the reaction mass was poured into a 1:1 mixture of methanol and ether. After separation of the solvent and drying, 6 g of polymer were obtained, which polymer was insoluble in hydrocarbons, ketones, ether, and N,N-dimethylformamide, and soluble in methylheptafluorobutyrate.

The polymer had the following elemental analysis: C = 26.1%; H = 1.08% (calculated values: C = 26.12%; H = 1.09). The intrinsic viscosity was 0.2 (100 cc/g) at 30°C as determined on a 0.5% solution of the polymer in $C_3F_7COOCH_3$.

A film of the polymer was deposited on a glass plate by evaporating a 1% solution of the polymer. The contact angle with hexadecane was measured, and the surface tension calculated according to the Fowkes method was $\gamma_{sd} = \gamma_c = 13$ dyne/cm.

A 10 × 10 cm sample of cotton fabric was impregnated using a 3% solution of the polymer in methylperfluorobutyrate. The dried fabric contained 1% by weight of the polymer. The fabric sample thus prepared possessed a repellency rating of 110 towards a mixture of 40% Nujol oil and 60% n-heptane (by volume). The same sample of fabric was impregnated and stained with a 10% by weight solution of olive oil in ether. The ether was then removed by evaporation.

After drying for 1 hour, the fabric was washed by mechanically flapping the fabric in 200 cc of a 0.5% solution of DASH detergent solution at 22°C (according to the methods outlined by J. C. Stewart and C. S. Whewell in *Textile Research Journal*, 20, 912, 1960, and by K. Durhan in *Surface Activity and Detergency*, MacMillan Co., London 1961, page 229).

After 30 minutes, by washing the fabric with water, drying and extracting with hot ether, it was determined that the oil had been completely removed during the washing.

This sample was again tested for oil repellency using the standard oil repellency test described hereinabove. The oil repellency rating thus determined was 90. This indicates excellent retention of the anti-stain property of the fabric.

EXAMPLE 17

A sample of 20 g of the amine having the formula $CF_3-O(C_3F_6O)_2-CF_2CH_2NH_2$, prepared according to the procedure of Example 16, was reacted in 50 cc of ethyl ether and in the presence of 12 cc of triethylamine with 6 cc of methacrylyl chloride. After filtering the amine hydrochloride and the evaporation of the solvent, the reaction product was distilled. 15 g of a fraction having a boiling point of 90°–92°C at 0.5 mm Hg were collected. The I.R. spectrum of this product corresponded to the following structure:

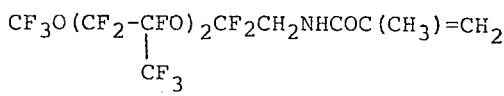

10 g of this product were polymerized in the presence 0.050 g of benzoylperoxide at 70°C. After 20 hours, the mixture was washed with a 1:1 mixture of methanol and ether and dried to constant weight. 5.1 g of polymer were obtained, this polymer having the following elemental analysis: C = 27.7%; H = 1.4% (calculated C = 27.6%; H = 1.42%). A film of the polymer was deposited on a glass plate by evaporation of a 1% solution of the polymer in $CFCl_2-CF_2Cl$, the intrinsic viscosity of which polymer, determined at 20°C, was 0.25 dl/g, and the contact angle with hexadecane was measured. The surface tension determined according to the Fowkes method as described in Example 1 was $\gamma_{sd} = \gamma_c = 18$ (dyne/cm).

EXAMPLE 18

A slow flow of gaseous $NH_3$ was introduced over a 30 minute period into a 100 cc glass flask provided with a dipping pipe and with a reflux condenser and containing 10 g of $CF_3O(CF_2O)_4CF_2COOCH_3$ (b.p. = 93°C at 55 mm Hg.) dissolved in 50 cc of ethyl ether. At the end of this period, the excess $NH_3$, ethyl ether and methanol were evaporated. The solution was then diluted with an additional 20 cc of ether and the diluted solution was added over a 1 hour period to a suspension of 2 g of $LiAlH_4$ in ethyl ether, maintained with stirring, at 0°C. The mixture was refluxed for an additional 3 hours. Then 5 cc of methanol were added to the solution and then the solution was poured into 100 g of water and ice. The organic layer was separated and dried over $K_2CO_3$. The ether was removed by evaporation and the residue was distilled. 6 g of a fraction having a b.p. of 95°C – 98°C at 30 mm Hg. were collected. The I.R. spectrum corresponded to the structural formula $CF_3O(CF_2O)_4-CF_2CH_2NH_2$.

5 g of this amine were reacted with 1.5 cc of acrylyl chloride in 20 cc of ethylether containing 3 cc of triethylamine for 3 hours at 35°C. The reaction mixture was then filtered from the amine chlorohydrate, and the ether solution was washed with water and dried over $Na_2SO_4$. The solvent was then evaporated and the residue distilled. 3 g of a fraction boiling at 95°–98°C at 0.5 mm Hg were collected. The I.R. spectrum corresponded to the structural formula: $CF_3O(CF_2O)_4-CF_2CH_2NH-CO-CH=CH_2$.

2 g of this monomer were polymerized under a nitrogen atmosphere in the presence of 0.02 g of azo-bis-isobutyronitrile for 10 hours at a temperature of 60°C. After washing with a 1:1 mixture of methanol and ether and drying to constant weight, 1.1 g of a polymer were obtained. The elemental analysis of this product was as follows: C = 25.2%; H = 1.3% (calculated C = 25%; H = 1.25%).

A film of this polymer was deposited on a glass plate from a 1% solution of the polymer in methylperfluorobutyrate, the intrinsic viscosity of which polymer as determined at 40°C was 0.4 dl/g. and the contact angle with hexadecane measured. The surface tension determined according to the Fowkes method as described in Example 1 was $\gamma_{sd} = \gamma_c = 14$ (dyne/cm). A sample of cotton fabric impregnated with 1% by weight of polymer and subjected to the oil-repellency test was completely repellent to a mixture of 40% Nujol oil and 60% by volume n-heptane.

EXAMPLE 19

A solution of 20 cc of

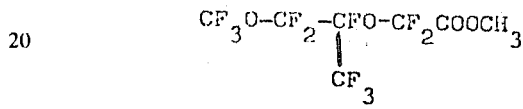

having a b.p. of 123°–125°C in ethyl ether was introduced into a 100 cc glass flask provided with a dipping pipe for the inlet of gases and reflux condenser. A flow of gaseous $CH_3-NH_2$ produced from the reaction of 50 cc of a 30% aqueous solution of the amine with a 40% NaOH solution was slowly bubbled into the flask. After one hour, at the end of the reaction, the excess of amine, ethyl ether and methanol was evaporated. The remaining ether-amide solution was added dropwise with stirring to a suspension of 5 g of $LiAlH_4$ in 200 cc of ether over a 1 hour period while maintaining the suspension at 0°C. The reaction mixture was then refluxed for an additional 5 hours and then cooled to 0°C.

10 cc of methanol were added and the whole was poured into 100 g of ice and water. 10 cc of a 40% solution of NaOH were added to this mixture and, after dissolving the inorganic derivatives, the ether layer was separated, the ether evaporated and the residue distilled. 20 g of a fraction boiling at 114°–116°C was obtained. The I.R. spectrum of this fraction contained absorptions for the stretching of the N-H bonds at 3350 cm$^{-1}$ and the C—H bonds at 2900 cm$^{-1}$. Based on the I.R. spectrum, the product was assigned the formula: $CF_3OC_3F_6OCF_2CH_2NHCH_3$.

To a mixture of 16 g of this secondary amine, 6 cc of triethyl amine and 50 cc of ether, cooled to 0°C, 4 cc of acrylyl chloride were added over a 1 hour period. The mixture was allowed to react for another 3 hours at 35°C. Thereafter, the amine chlorohydrate was filtered from the reaction mixture, the solvent was evaporated and the filtrate distilled. 12 g of a fraction boiling at 55°–58°C/0.5 mm Hg (182°C at 760 mm Hg) were obtained. The I.R. spectrum of this fraction indicated it had the formula

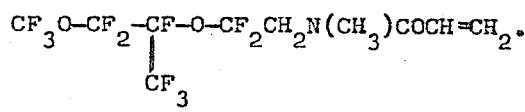

5 g of this monomer, diluted in 5 cc of ethylacetate, were polymerized in a glass vial for 15 hours, in the presence of 0.05 g of $B(iC_4H_9)_3$ and 1 cc of oxygen, at a temperature of 0°C. At the end of the polymerization, the polymer was precipitated by adding a 1:1 mixture of methanol and ether. After filtering and drying to constant weight, 3 g of a polymer were obtained. This polymer was insoluble in hydrocarbons and other non-fluorinated polar solvents such as ketones, ethers and esters, but was soluble in methylperfluorobutyrate, in which solution the polymer showed at 40°C an intrinsic viscosity of 0.55 dl/g.

A film of this polymer was deposited on a glass plate by evaporating a 1% solution of the polymer, and the contact angle with dodecane was measured. The surface tension calculated according to the Fowkes method as described in Example 1 was $\gamma_{sd} = \gamma_c = 17$ (dyne/cm).

EXAMPLE 20

30 g of a mixture of acids having an average formula $CF_3O(CF_2O)_n(C_3F_6O)_mCF_2$—COOH, wherein the sum of the indices $m+n$ is from 2 to 14 and the average value of the ratio m:n is about 3, and having an average equivalent acidimetric weight of 860, were esterified with diazomethane.

The esters were then dissolved in 100 cc of a 50% mixture of $CF_2Cl$—$CFCl_2$ and ethyl ether. The solution was then cooled to 0°C and anhydrous $NH_3$ was bubbled through it for 30 minutes until the amidation reaction was complete as determined by I.R. spectrography. The excess ammonia was evaporated and solvents and the methanol were evaporated under vaccum.

The amide mixture was dissolved in 50 cc of a 50% mixture of ethyl ether and $CF_2Cl$—$CFCl_2$, and this solution was then added dropwise over a 2 hour period to a suspension of 2 g of $LiAlH_4$ in 200 cc of ethyl ether maintained at 0°C. This mixture was then further reacted at 35°C for 6 hours. Thereupon, the $LiAlH_4$ excess was decomposed with a 20% aqueous solution of NaOH. The amine mixture was then separated, washed with water and dried over $K_2CO_3$. After evaporation of the solvents, 25 g of residue were obtained comprising a mixture of amines having the formula $CF_3O(C_3F_6O)_m(CF_2$—$O)_nCF_2CH_2NH_2$, with the values of the indices $m$ and $n$ corresponding to those of the starting mixture, as determined by N.M.R. analysis.

10 g of this amine mixture were reacted with 1.5 g of $CH_2$=CH—COCl in 50 cc of a 50% mixture of ethyl ether and $CF_2Cl$—$CFCl_2$, in the presence of a stoichiometric amount of $(C_2H_5)_3N$ at 0°C. The mixture was reacted at 0°C for 3 hours and then for 2 hours at room temperature.

The reaction mixture was then poured into 100 g of icy water, and the organic layer was separated and washed with water, and was then dried over $Na_2SO_4$. The solvents were then evaporated by distillation under vacuum. The residue obtained was a mixture of acrylamides as determined by I.R. analysis.

5 g of this mixture were dissolved in 10 cc of a 50% mixture of ethyl acetate and $CFCl_2$—$CF_2Cl$ and were then polymerized in a glass vial with $0.1 \times 10^{-3}$ g mole of $B(iC_4H_9)_3$ in the presence of 5 cc of dry air at room temperature for 6 hours.

The polymer was coagulated with an excess of acetone. The coagulate was washed with acetone and then dried by heating under vacuum at 30°C. 2.1 g of product were obtained, this product having an intrinsic viscosity as determined in methylperfluorobutyrate at 40°C of 0.25 dl/g. A film of this polymer was prepared by evaporation of a 1% methylperfluorobutyrate solution of the polymer on a glass plate. The surface tension was $\gamma_{sd} = \gamma_c = 13$ dyne/cm calculated according to the Fowkes method as described in Example 1.

Variations can, of course, be made without departing from the spirit and scope of this invention.

Having thus described out invention, what we desire to secure by Letters Patent and hereby claim is:

1. A polymer having a molecular weight of at least about 10,000 as determined by measurement of the intrinsic viscosity of a solution thereof, and which is selected from the group consisting of homopolymers of a monomer having the formula:

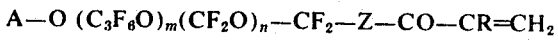

and copolymers of a mixture of at least two of said monomers wherein:
$C_3F_6$ represents a group obtained by the opening of the double bond of a hexafluoropropene molecule,
—$C_3F_6O$— and —$CF_2O$— are repeating oxyperfluoroalkylene units which, when simultaneously present, are distributed randomly along the chain,
$m$ is zero or an integer from 1 to 20, $n$ is an integer from 1 to 20, the sum of $m+n$ is an integer from 1 to 20,
A is a $CF_3$— or $CF_3$—O—$CF(CF_3)$— terminal group,
Z is —$CH_2NR'$— wherein R and R' are the same or different and are hydrogen or $CH_3$.

2. The polymer of claim 1, wherein Z is —$CH_2NH$—.

3. The polymer of claim 1, wherein Z is —$CH_2N(CH_3)$—.

4. The polymer of claim 1, wherein said repeating oxyperfluoroalkylene units are derived from a mixture of monomers wherein the sum of m+n is in the range from 1 to 4 and the average ratio m/n is 3.

5. The polymer of claim 1, wherein said repeating oxyperfluoroalkylene units are derived from a mixture of monomers wherein the sum of m+n is in the range from 2 to 14 and the average ratio $m/n$ is about 3.

6. The copolymer of claim 1, in which at least half the repeating units are derived from said monomer.

7. The copolymer of claim 1, in which more than about 80% of the repeating units are derived from said monomer.

8. The polymer of claim 1, wherein the intrinsic viscosity is measured in a solution of said polymer in phenylfluoroform, methylperfluorobutyrate or $CFCl_2$—$CF_2Cl$.

9. A fabric impregnated with the polymer of claim 1.

* * * * *

UNITED STATES PATENT OFFICE
CERTIFICATE OF CORRECTION

Patent No. 3,864,318        Dated February 4, 1975

Inventor(s) Gerardo CAPORICCIO and Ezio STREPPAROLA

It is certified that error appears in the above-identified patent and that said Letters Patent are hereby corrected as shown below:

Column 3, line 5: "alcohol of by formula" should read -- alcohol of formula --.

Column 6, line 9: "dimethyloxyethane" should read -- dimethoxyethane --.

Column 8, line 1: "polyester" should read -- polyether --; lines 23-24: "polyfluro" should read -- polyfluoro --.

Column 10, line 26: "evalulated" should read -- evaluated --; line 29: "J.H. Simmons" should read -- J.H. Simons --; lines 42-44:

"A sample of 100 g of

A sample of 100 g of $CF_3-O-(CF_2-CF(CF_3)-O)_2-CF_2COOH$ acid acid" should read:

-- A sample of 100 g of $CF_3-O-(CF_2-CF(CF_3)-O)_2-CF_2COOH$ acid --.

Column 12, lines 3-5:

UNITED STATES PATENT OFFICE
CERTIFICATE OF CORRECTION

PO-1050
(5/69)

Patent No. 3,864,318      Dated February 4, 1975

Inventor(s) Gerardo CAPORICCIO and Ezio STREPPAROLA

It is certified that error appears in the above-identified patent and that said Letters Patent are hereby corrected as shown below:

" 10 g of the 10 g of the $CF_3-O-(CF_2-CF-O)_3-CF_2-CH_2OH$   " should read:
$\phantom{10 g of the CF_3-O-(CF_2-}|$
$\phantom{10 g of the CF_3-O-(CF_2-}CF_3$ -- 10 g of the                          --.

$\phantom{--}CF_3-O-(CF_2-CF-O)_3-CF_2-CH_2OH$
$\phantom{--CF_3-O-(CF_2-}|$
$\phantom{--CF_3-O-(CF_2-}CF_3$ Column 12, line 52: "n are defined" should read -- n are as defined --.

Column 14, line 27: "methylperfluorbutyrate" should read -- methylperfluorobutyrate --; line 59: "homogenous" should read -- homogeneous --.

Column 17, line 14: "2 of" should read -- 2 g of --.

Column 18, line 37: "ethyl ester" should read -- ethyl ether --; line 67: "homogenous" should read -- homogeneous --.

Column 19, line 4: "icy" should read -- ice --; line 9: "corrsponded" should read -- corresponded --.

-2-

CERTIFICATE OF CORRECTION

Patent No. 3,864,318   Dated February 4, 1975

Inventor(s) Gerardo CAPORICCIO and Ezio STREPPAROLA

It is certified that error appears in the above-identified patent and that said Letters Patent are hereby corrected as shown below:

Column 21, lines 18-19: "presence 0.050" should read -- presence of 0.050 --.

Column 22, line 26: "and reflux" should read -- and a reflux --.

Column 24, line 16: "out" should read -- our --.

Signed and sealed this 6th day of May 1975.

(SEAL)
Attest:

RUTH C. MASON
Attesting Officer

C. MARSHALL DANN
Commissioner of Patents
and Trademarks